UNITED STATES PATENT OFFICE.

DAVID CHIDLOW, OF WASHINGTON, DISTRICT OF COLUMBIA.

METHOD OF MAKING BREAD.

No. 863,021.   Specification of Letters Patent.   Patented Aug. 13, 1907.

Application filed June 29, 1906. Serial No. 324,104.

*To all whom it may concern:*

Be it known that I, DAVID CHIDLOW, a subject of the King of Great Britain, residing at Washington, in the District of Columbia, have invented certain new and useful Improvements in Methods of Making Bread, of which the following is a specification.

In the process of bread making by fermentation, whether carried out by the housewife or the professional baker, two leading methods are employed; the oldest, known as sponge and dough, the other as straight dough. In the sponge and dough method about half of the liquid and flour, and usually all of the yeast are mixed together and allowed to ferment until the formed gases can no longer be held by the distended gluten. The sponge is then said to "fall". The balance of the liquid, flour, and other ingredients are then added to the sponge and made into dough. In the straight dough method, there is no preliminary sponge, the dough being made at once, using all the ingredients and flour required. In both methods, the essential ingredients are flour, water, yeast, and salt, and various other materials, such as sugar, glucose, and so on, according to the edible character desired in the resulting product.

After the dough is made, it is allowed to expand or "rise" until the initial volume of the dough has been more than doubled. The dough is then kneaded or "knocked down" to expel the imprisoned gases. This operation is repeated as many as five or six times. One of the reasons that the baker permits the dough to rise several times is to render the dough elastic. When sufficiently elastic the baker assumes that the dough is ready to be made into loaves. This elasticity has been effected by the action of the acids formed during fermentation upon glutenin, one of the constituents of the gluten. These methods are open to vital objections on account of the number of complex chemical changes taking place in the dough which tend to render the bread sour, due to the production of acids by bacteria grown at the expense of the sugar and other nutrients of the flour, and the ultimate quality of the bread. The production of good bread is thereby rendered a matter of much uncertainty, in addition to the unnecessary waste of labor and ingredients. The acid formed by bacteria in the dough, continues to be produced even after the baker has decided that his dough is sufficiently elastic and often the bread is thus rendered sour, by the continued activity of the souring bacteria up to the point of baking. In the earlier part of fermentation, the acid formed is chiefly lactic acid, the latter stages develop acetic acid, and when the dough has reached the elasticity desired by the baker, there has been formed a number of organic acids.

It is well known that the peculiar substance differentiating wheat flour from other flours is due to the presence of gluten; and that gluten is practically composed of two proteids, viz:—gliadin and glutenin. The ratio that these two substances bear to the gluten is fairly constant for definite types of flour. In good bread flours the gliadin constitutes about 60 per cent. of the gluten. When a dough is first made the percentage of gliadin is approximately the same as in the flour. If we assume this to be 60 per cent., then after the dough has fermented one hour the percentage of gliadin has increased and so increases for each period of fermentation in the same dough. When the baker considers the dough sufficiently elastic the gliadin has increased considerably, ranging from 70 to 90 per cent. Accompanying this change is a constant increase in the acidity, such acidity being much greater than that indicated by its chemical determination on the dough; in fact, as fast as the acid is thus formed, a part of it combines with the glutenin to form gliadin.

Most of the difficulties and uncertainties connected with bread making are founded upon disregard of the fact that acids are necessary to effect the changes in the dough, and consequently fermentation is conducted upon such conditions as to form the acid slowly by means of microbic activity over which the baker is unable to exercise due control for the production of uniform results. The object of the present invention is to do away with this uncertainty incident to repeated fermentations and kneading, enable the baker to control these chemical changes and make bread free from sourness and other objectionable qualities; and incidentally effect economy of labor and ingredients used for bread making.

I have discovered that if I add a small proportion of certain mineral or organic acid or acid salt, that this acts at once upon the gluten, rendering it elastic and, therefore, doing away with the necessity of permitting the unrestrained and uncontrolled growth of souring bacteria. Furthermore, in order to allow sufficient time for the growth of acid forming bacteria in the old method, the yeast consumes an unnecessary amount of sugar, which, under the old methods, the baker must replace in order to retain the normal sweetness of the bread. The purpose of adding fats in bread making is also to assist in the softening of the gluten, a condition sought by the baker in the old method, whereas, by my present process, this softening of the gluten and its elastic condition is secured by the added acid, and the only fermentation required is that sufficient to aerate the dough. Therefore, sugar, yeast and fat used can be materially reduced and the successive kneadings will be unnecessary. The quantity of fat to be added will depend upon the different varieties of wheat from which the flour used is made. In some instances, there will be sufficient fat contained in the flour as not to require the addition of any fat. In other cases, where the flour is made from another character of wheat, said flour will contain but little fat, and, consequently, in that case, it will be necessary to add fat to produce the result desired.

The general trend of bread making is to largely increase the proportion of yeast and enriching ingredients. The average composition for bread doughs for making what is known as home made bread is 100 pounds flour, 62 pounds water, 2½ pounds lard or other fats, 2¼ pounds sugar, as cane sugar, malt extract or other saccharine substance, 1 pound compressed yeast, 1½ pounds salt. This is made at a temperature of about 84 Fahrenheit and is fermented about six hours, then divided and molded into loaves and placed in pans and allowed to rise. Ordinarily the dough is exposed to many vicissitudes during its fermentation. The possible losses from this source increase the longer the dough is fermented. For this reason many bakers have shortened the fermenting process to four hours. This would require 1½ pounds of compressed yeast percental of flour.

By the use of my invention a baker could prepare a dough similar to this referred to in the preceding paragraph, using one third the amount of yeast, one third the amount of sugar and one half the amount of shortening, together with a much greater certainty of securing the desired character of bread. Under present conditions this would effect a saving on a four hour dough of about thirty three cents for every cental of flour used—approximately sixty cents per barrel of flour. In other words, it would save more than half the cost of the ingredients used in bread making excepting flour.

In carrying out my method I proceed in the following manner: Assuming the use of the usual bread flour, and making the type of bread usually known as home-made, I take one hundred pounds of flour, sixty two pounds of water, half pound of yeast, one pound of fat, one pound of sugar, and one pound, seven ounces of salt. I add to the water two ounces of acid tartrate of potash and make the water at such a temperature as to insure a dough temperature of about 88° F. At the end of three hours, when fermentation has been vigorously established, the dough is cut over to insure uniform temperature, and one hour later the dough is made into loaves ready for the oven. It will then be seen that by my method the repeated fermentations usually followed by the baker under uncontrollable conditions as to the acidity produced in the bread are altogether avoided, the added acid at once supplying the characteristic necessary to secure the proper elastic condition of the gluten.

In my experience, I have discovered that, in lieu of the acid tartrate of potash which I mention above and have included as an element of my claims, I may use sulfuric acid, acid potassium sulfate, hydrochloric acid, tartaric acid, acid sodium tartrate, acetic acid, lactic acid, butyric acid, succinic acid, oleic acid, as well as mixtures of these acids, and obtain equally good results, any of said acids being for purposes hereof considered as equivalents of each other as well as of the acid potassium tartrate, the particular acid to be used in a given case depending upon the character of the flour used in the process.

I have also discovered that the whole effect of the addition of acid phosphates is to delay the maturity of the dough. For that reason phosphoric acid could not be used in my process and said acid is not and could not be considered the equivalent of any of the acids used by me, certain of which are specifically named herein.

It will be apparent, of course, to those skilled in the art, that other acids may be used to accomplish the same result, and I, therefore, do not limit myself to the particular acids specifically named herein.

Having thus described my invention, what I claim and desire to secure by Letters Patent is:

1. The method of making bread which consists in mixing together flour, yeast, water and acid tartrate of potash in substantially the proportions described, permitting the mixture to rise, and then baking the mixture.

2. The method of making bread which consists in mixing together flour, yeast, fat, water and acid tartrate of potash in substantially the proportions described, permitting the mixture to rise, and then baking the mixture.

In testimony whereof I affix my signature in presence of two witnesses.

DAVID CHIDLOW.

Witnesses:
A. R. HAUTER,
EDWIN S. CLARKSON.